United States Patent [19]

Winner

[11] Patent Number: 4,565,451

[45] Date of Patent: Jan. 21, 1986

[54] METHOD AND APPARATUS FOR COMBINING GRANULAR COMPONENTS

[76] Inventor: Eduard Winner, Weierstrasse 3, CH-9500 Wil, Switzerland

[21] Appl. No.: 653,494

[22] Filed: Sep. 21, 1984

[30] Foreign Application Priority Data

Sep. 21, 1983 [DE] Fed. Rep. of Germany ....... 3334013

[51] Int. Cl.[4] ........................ B01F 11/00; B01F 15/04; B65D 83/06; G01F 11/24

[52] U.S. Cl. .................................... 366/108; 222/142; 222/403; 222/414; 366/154; 366/181; 366/182

[58] Field of Search ........................ 118/308, 310, 311; 222/142, 403, 414; 366/108, 150, 154, 181, 182, 156

[56] References Cited

U.S. PATENT DOCUMENTS

| | | | |
|---|---|---|---|
| 1,096,785 | 5/1914 | Jensen | 222/142 |
| 2,068,761 | 1/1937 | Penley | 118/310 |
| 2,321,082 | 6/1943 | Harshberger | 222/414 |
| 3,580,326 | 5/1971 | Edwards | 366/156 |
| 3,814,386 | 6/1974 | Guglietti | 366/108 |
| 4,201,484 | 5/1980 | Sasiela et al. | 366/156 |

*Primary Examiner*—Philip R. Coe
*Assistant Examiner*—Scott J. Haugland
*Attorney, Agent, or Firm*—Becker & Becker, Inc.

[57] ABSTRACT

A method and apparatus for combining granular components. The granular material, in finely divided form, is moved from spaced-apart locations into flight paths or trajectories which overlap or cross one another. The mixing of the components first takes place in the cross-over zone of the trajectories. The material is thus continuously and uniformly mixed in a simple manner. The apparatus for carrying out the method includes two drums which are rotated in opposite directions. Receivers for the components are distributed on the surfaces of the drums. An extraction device is located between the drums for removing the granular material from the receivers as the drums rotate. In the region below the extraction device, there is disposed a mixing zone in which the trajectories of the material cross one another.

19 Claims, 3 Drawing Figures

METHOD AND APPARATUS FOR COMBINING GRANULAR COMPONENTS

BACKGROUND OF THE INVENTION

1. Field of the Invention

The present invention relates to a method of combining granular components, according to which the components are combined and mixed together. The present invention also relates to an apparatus for carrying out such a method.

2. Description of the Prior Art

It is known to supply granular material to a mixing chamber, where the material is mechanically mixed. The degree of mixing is dependent, among other things, upon the mixture time, so that with the heretofore known methods the mixing of granular material takes a relatively long period of time. As a result, a lot of energy is consumed, which increases the cost of such methods.

The apparatus for carrying out such methods has rotating containers, for example rotating drums with inlets and outlets. By rotating the drums, the granular material constantly shifts in position, as a result of which a gradual mixing of these materials is achieved. However, such apparatuses are structurally complex, and are correspondingly expensive.

An object of the present invention is to provide a method and apparatus of the aforementioned general type according to which the granular components can be mixed very uniformly with one another in as short a period of time as possible, and with little structural expense.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
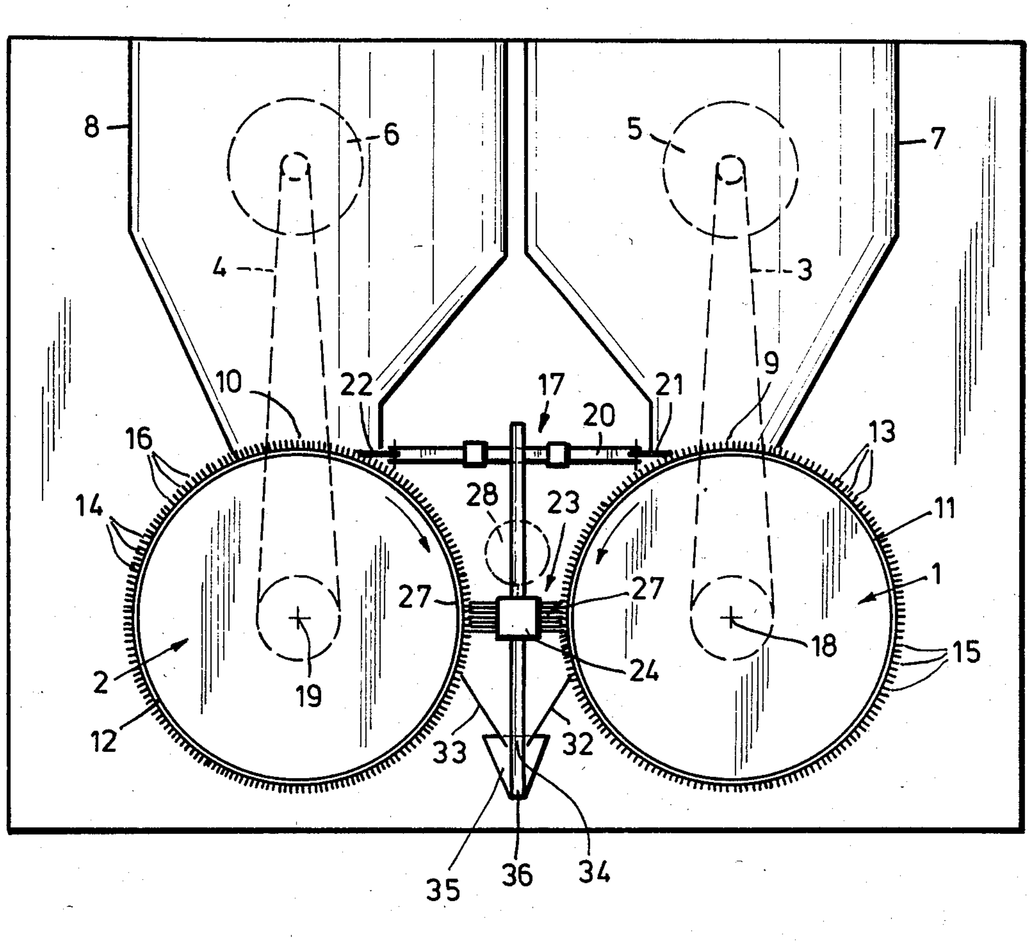
FIG. 1 schematically illustrates a first embodiment of the inventive apparatus.

The method of the present invention is characterized primarily in that the components, each in divided form, are moved from spaced-apart locations into flight paths or trajectories which overlap or cross one another; the components are collected below the crossover zone of the trajectories. The components may be guided for their collection from their trajectories.

The apparatus of the present invention for carrying out the inventive method is characterized primarily in that the apparatus includes two drums which are disposed parallel to one another, which are rotatably driven in opposite directions, and which are provided on their surfaces with receiving means whch are distributed over the drum surface for the components. Repsective supply means for the respective components are associated with each of the drums. In the region between the drums there is provided an extraction device with which the components can be removed from the receiving means. In the region below this extraction device, there is provided a mixing zone in which the trajectories of the components overlap or cross one another.

With inventive method, the components which are the to be mixed together are delivered into flight paths or trajectories from spaced-apart locations. So that a uniform mixing of the components can be achieved, the components are present in the trajectories in divided form. Furthermore, the trajectories are provided in such a way that they cross one another. Thus, the components in the trajectories are first mixed with one another in the crossover zone. Since the components are present in divided form, a very uniform mixing thereof takes place in the crossover zone of the trajectories without the method having to be carried out in a complicated manner. The mixed components are then collected in the crossover zone of the trajectories. This can be accomplished, for example, by providing a collector for the mixed components in the crossover zone, i.e. in the mixing zone. However, it is also possible to utilize the inventive method in conjunction with a coating process. In this case, the material or item which is to be coated is guided in the region below the crossover zone of the trajectories, so that the components which are to form the coating can pass immediately after the mixing directly onto the item which is to be coated. As a result, there is not necessary to temporarily store the mixed components.

With the inventive apparatus for carrying out the method of the present invention, the two oppositely driven drums first serve to receive upon their surfaces the components which are supplied via the feed means. The components are uniformly distributed in the receiving means of the drums. When the drums rotate, the receiving means pass into the region of the extraction device, which then removes the components from the receiving means. Since the drums are executing a rotary motion, the components located in the receiving means are thrown out from the drum surfaces, so that the granular components fly out from the drums in flight paths or trajectories.

In the mixing zone provided in the region below the extraction device, the trajectories then cross one another, so that mixing of the components is effected in this zone. The inventive apparatus is structurally very straight forward. Since the drums rotate continuously, a continuous mixing of the components is effected, with the components being continuously removed from the receiving means in the region of the extraction device. The components which are to be mixed remain in the receiving means only long enough to allow them to pass from the feed means to the extraction device, since the mixing is effected during the flight of the components. Therefore, the time that the granular products remain on the drums is relatively short. The components can be distributed very uniformly in the receiving means on the drum surfaces, so that the components can also exist in finely divided form in the trajectories, and so that a very homogeneous mixing can take place in the crossover zone of the trajectories.

Pursuant to further specific features of the apparatus of the present invention, the drums can be driven independently of one another. The receiving means can be defined by needles or rods which project at right angles from the surfaces of the drums. These rods can be uniformly distributed over the drum surfaces. The receiving means can also be defined by cross pieces or elements which project at right angles from the surfaces of the drums. These elements can be uniformly spaced from one another along the drum surfaces. Furthermore, the elements can extend over the length of the drum, and can extend parallel to the axis thereof.

The extraction device can be provided with needles or rods which project into the receiving means, and which project from a holder which is disposed between the drums. This holder can be driven in a vibratory manner, and particularly in such a way as to vibrate axially.

Alternatively, the extraction device can be provided with at least one holder which in turn is provided with air passages. These air passages can be directed at an angle to the axes of the drums.

A guide arrangement can be disposed in the region below the crossover zone of the trajectories. This guide arrangement can be formed by two guide plates which converge in the direction of flight, and which define an outlet for the mixed components. A screen can be disposed in the region below the guide arrangement. This screen can be driven in a vibratory manner and in particular in such a way as to vibrate axially. The holder of the extraction device, and the screen, can be provided with a common vibration drive.

DESCRIPTION OF PREFERRED EMBODIMENTS

Figure 2:
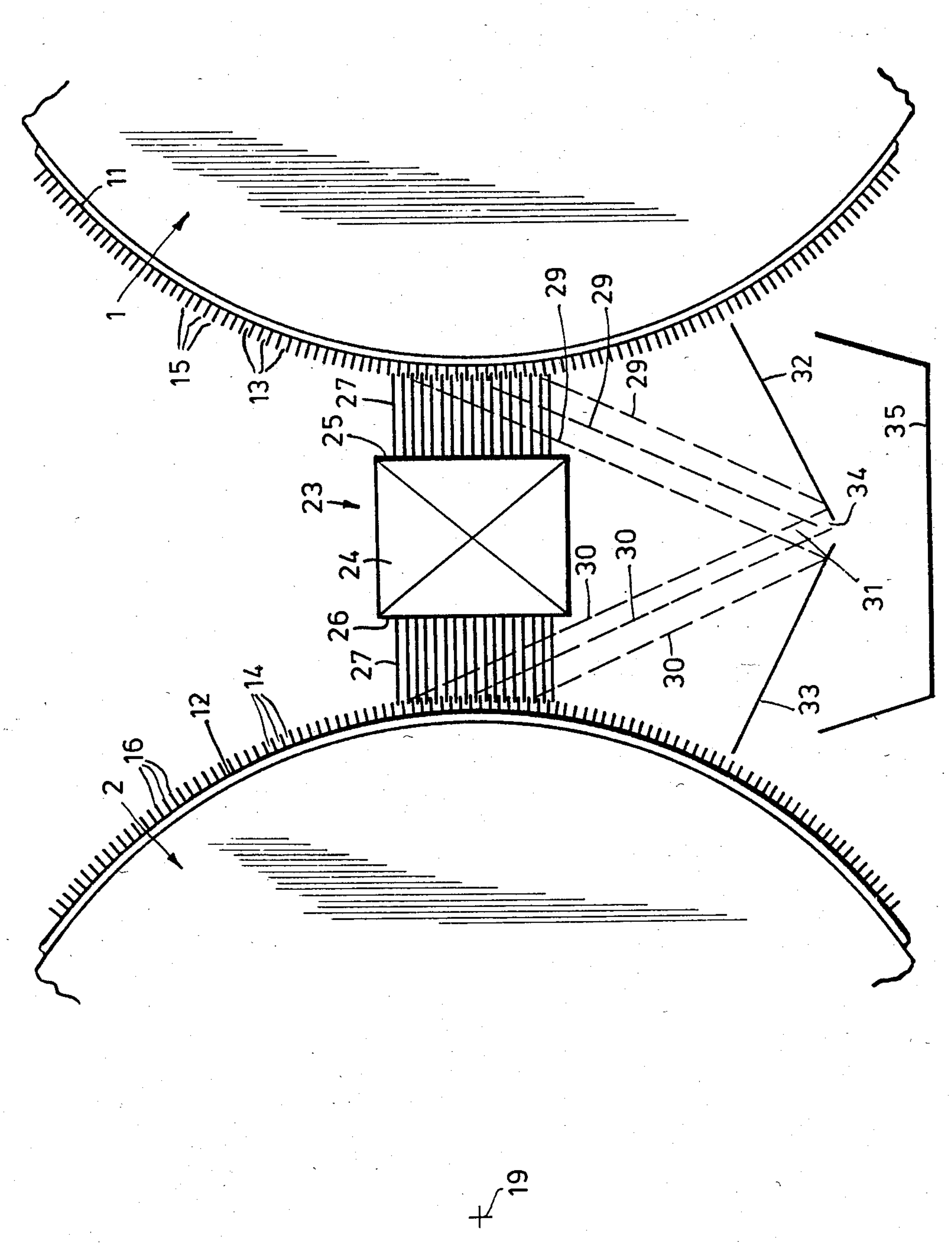
FIG. 2 is an enlarged view of a portion of the apparatus of FIG. 1.

Referring now to the drawings in detail, the apparatus illustrated in FIGS. 1 and 2 has two parallel drums 1 and 2 which are disposed next to one another, and which are rotatably driven in opposite directions. In the illustrated embodiment, each drum 1 and 2 is driven via a respective belt or chain drive 3 and 4 by a motor 5 and 6. A respective feed hopper 7 or 8 is provided in the region above each drum 1 and 2. The components which are to be mixed with one another are supplied via these hoppers. The feed hoppers 7 and 8 extend over the entire length of the drums 1 and 2, and have an outlet 9 and 10 which extends over this length and through which the granular components pass out of the hoppers onto the surfaces 11 and 12 of the drums 1 and 2. Disposed on the drum surfaces 11 and 12 are receiving means 13 and 14 in which the granular components can be held in such a way that they are distributed over the drum surfaces. In the illustrated embodiment, the receiving means 13 and 14 are defined by transversely projecting needles or rods 15 and 16 which preferably project at right angles from the drum surface 11 and 12; the rods 15 and 16 are provided over the entire periphery of the drums and over the entire length thereof. The rods 15, 16 can be successively arranged in the axial direction with a space between successive ones thereof, or can also, for example, also can be helically distributed on the drum surface 11, 12. The distance that the rods 15, 16 are spaced from one another, and hence the sizes of the receiving means 13 and 14, depends upon the particle size of the components which are to be mixed. The larger the particle size of the components, the greater is the distance between the rods 15 and 16. Correspondingly, the distance between the rods is small when the particle size of the components is fine.

In the region between the two drums 1 and 2, which in the illustrated embodiment are identical, there is disposed a wiper device or doctor blade 17 which during rotation of the drums removes excess components from the drum surfaces. The doctor blade arrangement 17 is provided with a holder 20 which is disposed at right angles to the longitudinal axes 18, 19 of the drums 1, 2, and on both of the ends of which are mounted wipers or doctors blades 21 and 22 which extend to the rods 15, 16. The doctor blades 21, 22 project slightly into the outlets 9, 10 of the feed hoppers 7 and 8, and remove the granular material which sticks out beyond the rods 15, 16. This assures that the granular components are uniformly distributed within the receiving means 13 and 14.

In the region below the doctor blade arrangement 17 and between the drums 1 and 2, there is disposed an extraction device 23 with which the granular components can be withdrawn from the receiving means 13 and 14. The extraction device 23 had a holder 24, which is disposed parallel to the longitudinal axes 18 and 19 of the drums 1 and 2, and is disposed at the level of these axes. Needles or rods 27 are mounted on those sides 25 and 26 of the holder 24 which face the drums 1 and 2. The rods 27 are preferably made of metal, and project into the receiving means 13 and 14. The rods 27 are disposed parallel to one another as well as at right angles to the longitudinal axes 18 and 19 of the drums 1 and 2. The job of the rods 27 is to withdraw the granular components found in the receiving means 13 and 14 during the rotation of the drums 1 and 2. To avoid damage to the surface 11, 12 of the drums, as well as to the rods 27, the latter do not extend all the way to the surface of the drums, but rather are spaced slightly therefrom.

In order to make it possible for the granular components to be reliably withdrawn from the receiving means 13 and 14 by means of the extraction device 23, the holder 24 is driven in such a way as to be axially vibrated. A vibration motor 28 is provided for this purpose. Due to the axial vibrations of the holder 24, and hence of the rods 27, the granular components are thrown or flung out of the receiving means 13 and 14 of the rollers 1 and 2 during rotation of the latter. As a result of the intersection of the rotation of the drums 1, 2 with the vibrational movement, the granular components are thrown out in flight paths or trajectories 29 and 30 which are directed downwardly at an angle, and which cross one another in a zone 31. Since the granular components are finely distributed over the drum surfaces 11 and 12, they are also finely distributed in the trajectories 29, 30. Therefore, the components are very homogeneously mixed in the crossover zone 31. Since the drums 1, 2 rotate and the components are continually supplied via the feed hoppers 7 and 8, the components located in the feed hoppers are continuously mixed in this manner.

Disposed in the region below the extraction device 23 are two slide plates 32, 33 which converge downwardly and define an outlet 34 for the mixed components, which outlet extends over the length of the slide plates. The slide plates 32, 33, which extend nearly to the drum surfaces 11 and 12, form guide members with which the trajectories 29, 30 of the components are deflected downwardly in the crossover zone 31. Since the deflection takes place in the crossover zone 31, a separation of the components is reliably prevented.

The intermixed components drop through the outlet 34 onto a screen 35, which is also driven in such a way as to vibrate axially. In order to achieve a structurally simple vibration drive, the screen 35 and the holder 24 of the extraction device 23 are connected with the vibration motor 28 by a common connecting element 36, so that both of them can be driven in common by this element.

For this mixing process, the granular components are separately filled into the feed hoppers 7 and 8. The two drums 1 and 2 are independently driven in opposite directions by the motors 5 and 6 (see the arrows in FIG. 1). Stirring devices and the like can be disposed in the feed hoppers 7, 8 in order to ensure a constant and uniform supply of the components to the drums. Since the oulets 9 and 10 are provided over the entire length of the drums, the material passes uniformly into the receiving means 13 and 14 which are distributed over the length and the periphery of the drums 1 and 2. The doctor blades 21 and 22 remove excess material from the surface of the drums, so that behind the doctor blades 21, 22, in the direction of rotation, no excess materials can drop off from the drum surfaces. The rods 15, 16 of the drums 1, 2 reliably hold the components securely on the drum surfaces 11, 12. As soon as the components pass into the region of the extraction device 23, which is disposed 90° from the outlets 9 and 10, the granular material is thrown out of the receiving means 13, 14 by means of the rods 27, which axially vibrate relative to the drums 1, 2. In conjunction with the rotation of the drums, the components obtain the trajectories 29 and 30. Since the rods 27 reach into the region between the rods 15 and 16 of the drums 1 and 2, the components are reliably thrown out of the receiving means 13 and 14. The speed of rotation of the drums 1 and 2 can be set as a function of the specific weight of the components which are to be mixed in such a way that the trajectories 29 and 30 overlap or cross one another in the zone 31. Thus, the mixing of the up to now separately supplied components first takes place in this zone. Since the slide plates 32, 33 are also disposed in this zone, the components are guided to the screen 35 in this mixed state. Since the screen 35 also vibrates, the mixed components pass uniformly to the screen.

With the apparatus of the present invention, very different types of components can be continuously mixed in a simple manner. This apparatus is particularly suitable for processing granular reclaimed material produced from waste products. These reclaimed materials can be mixed with another granular component in the manner previously described.

So that the mixed components do not stick to the slide plates 32, 33, the latter are preferably chrome-plated and are anti-static. The mixing ratio of the two components can be very easily fixed by setting the speeds of the drums 1 and 2. These drums are driven independently of one another, so that their speeds can be independently set. The quicker the drums turn, the greater the amount of components which are thrown into the mixing zone 31 in a given period of time. Thus, by setting the speed of the drums, the proportion of the given components can be precisely fixed. Since the flight or trajectory characteristics of the respective components also depend upon the specific weight thereof, this can also be taken into consideration when setting the speed of the drums.

When the inventive apparatus is used for mixing together granualar components, the components can be very coarse, medium-grained, or fine-grained, and can even be in the form of powder.

However, the inventive apparatus can be used not only for mixing, but also for the dosing of components. When the dosing of components is involved, the essential thing is that per given unit of time, always the same amount of components are supplied to a subsequent processing station or the like. In this case, the same components are filled into the two feed hoppers 7, 8. Since two drums 1 and 2 are provided for these components, the drums can be driven at a lower speed, as a result of which the source of error during dosing is reduced quite considerably. As a result, per unit of time the same quantity of components can always be supplied. The inventive apparatus can be utilized in conjunction with a coating unit. In this case, the apparatus is disposed in such a way that the components which drop down through the screen 35 fall directly onto the material which is to be coated. Since a very precise dosing can be obtained with the inventive apparatus, items can be coated extremely uniformly. Furthermore, with the inventive apparatus the mixture can be mixed and at the same time applied in a single step. If for instance different components are present in the two feed hoppers 7, 8, they then can be mixed in the previously described manner in any desired mixing ratio, and subsequently can be applied directly onto the material which is to be coated. Instead of using the components to provide a coating, it is also possible to fill a container or the like with the components.

Since the speed of the drums 1 and 2 can be set very easily and quickly, the inventive apparatus can be converted within a very short period of time in the event that other components are to be mixed with one another.

Eccentric drives or magnetic drives can be used as the vibration motors 28.

Figure 3:
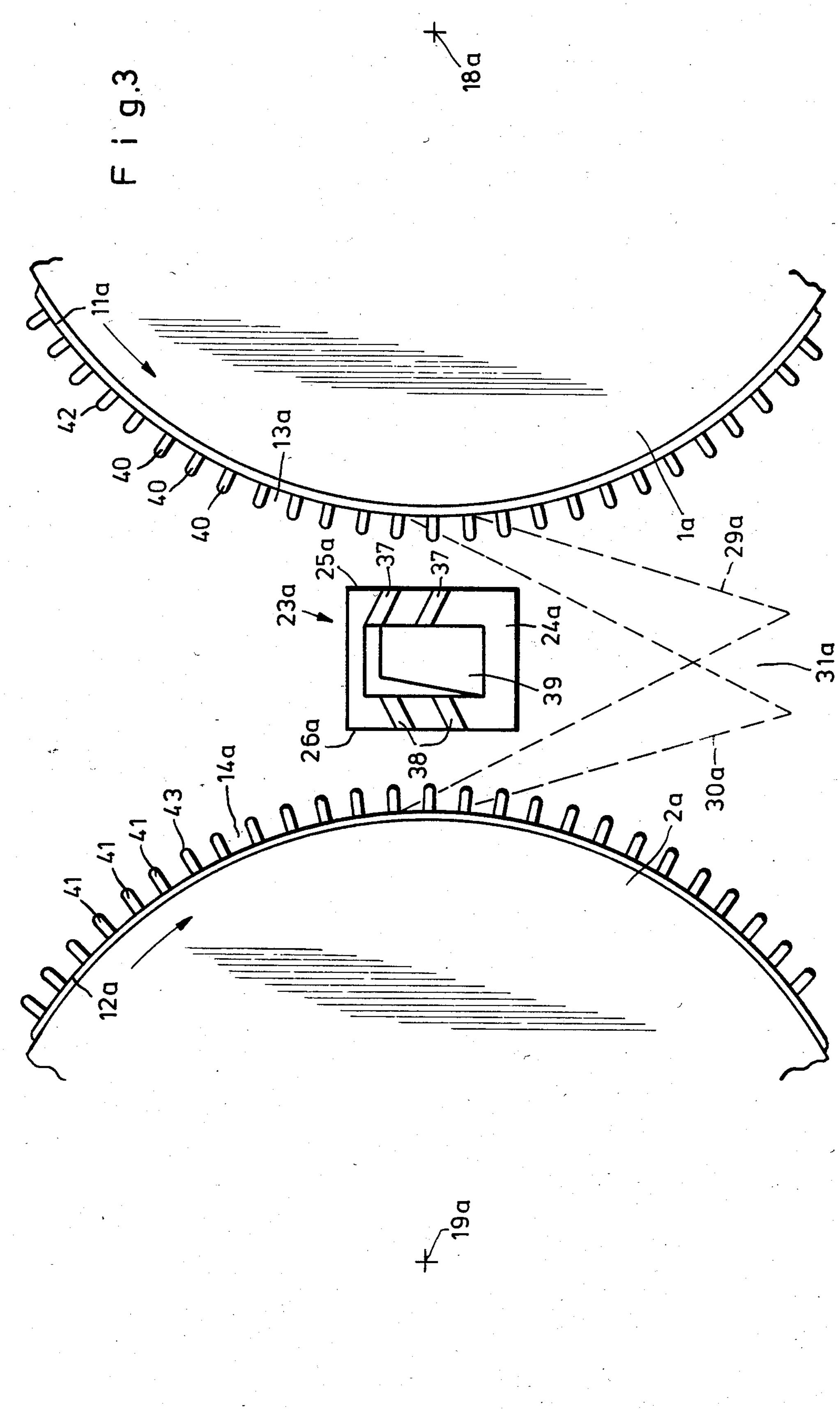
FIG. 3 shows a portion of a further embodiment of the inventive apparatus.

In the embodiment illustrated in FIG. 3, the components accommodated in the receiving means **13*a* and 14*a* are thrown out pneumatically rather than mechanically. The extraction device 23*a* is again disposed centrally between the two drums 1*a* and 2*a* at the level of the axes of rotation 18*a* and 19*a*. The extraction device 23*a* has a holder 24*a* in which are disposed air passages 37 and 38 which are disposed at an angle to the longitudinal sides 25*a* and 26*a* of the holder 24*a*, and which open into these longitudinal sides. The air passages 37 and 38 communicate with a central air supply channel 39. The air passages 37, 38 are disposed at an obtuse angle to one another, and extend downwardly at an angle. The air exiting the air passages 37, 38 strikes the receiving means 13*a* and 14*a* at an angle, and blows out the components located therein. In conjunction with the rotation of the drums 1*a* and 2*a*, the components are thrown out in such a way that their flight paths or trajectories 29*a*, 30*a* again overlap or cross one another in the zone 31*a*. As was the case with the previously described embodiment, this crossover zone 31*a* extends over the entire length of the drums 1*a*, 2*a*, over which the receiving means 13*a*, 14*a* are distributed. The air passages 37, 38 are therefore also distributed over the length of the holder 24*a*, in order to be able to blow out the components over the entire length of the drums. In the illustrated embodiment, the air passages 37 on the longitudinal side 25*a* on the one hand, and the air passages 38 on the other longitudinal side 26*a* on the other hand, are both disposed in two rows arranged one above the other. Depending upon the construction of the drums 1*a*, 2*a* and the holder 24*a*, it also would be possible to dispose only one row of air passages, or more than two rows of air passages one above the other, on each of the two sides of the holder. Depending upon the type of material, the air can be supplied at different pressures, so that the components can be reliably blown out of the receiving means 13*a* and 14*a*. Such an extraction device which operates with compressed air is advantageously suitable for mixing fine grained material, for example, for mixing powders. So that the fine grained powder can be reliably held on the drum surfaces 11***a*, 12*a*, the receiving means 13*a*, 14*a* are defined by cross pieces or elements 40, 41 which extend axially over the length of the drums 1*a* and 2*a*. The elements 40, 41 project at right angles from the drum surfaces 11*a*, 12*a*, and their ends 42, 43 are rounded off.

The present invention is, of course, in no way restricted to the specific disclosure of the specification and drawings, but also encompasses any modifications within the scope of the appended claims.

I claim:

1. An apparatus for combining granular components including combining said components in divided form and mixing them together by moving said components from spaced-apart locations into trajectories which cross one another to thus effect the mixing of said components; said apparatus comprising:

two drums having longitudinal axes disposed parallel to one another, with said drums being spaced apart adjacent to one another; said drums are rotatably driven in opposite directions, and are each provided with an outer surface;

a respective supply means associated with each of said drums for supplying said components thereto;

respective receiving means distributed over each of said drum surfaces for receiving said components from said supply means; and an extraction device provided in the region between said drums for withdrawing said components from said receiving means in such a way as to impart thereto trajectories which cross one another in a mixing zone which is provided below said extraction device.

2. An apparatus according to claim 1, which includes means for driving said drums independently of one another.

3. An apparatus according to claim 1, in which said receiving means are defined by rods which project from said drum surfaces at right angles thereto.

4. An apparatus according to claim 3, in which said rods are uniformly distributed over said drum surfaces.

5. An apparatus according to claim 1, in which said receiving means are defined by elements which project from said drum surfaces at right angles thereto.

6. An apparatus according to claim 5, in which said elements, on a given drum, are uniformly spaced along said surface thereof.

7. An apparatus according to claim 6, in which said elements extend over the length of said drums.

8. An apparatus according to claim 7, in which said elements extend parallel to said longitudinal axes of said drums.

9. An apparatus according to claim 1, in which said extraction device includes a holder disposed between said drums, and rods which project from said holder and into said receiving means of said drums to effect withdrawal of said components therefrom.

10. An apparatus according to claim 9, in which said holder is driven in such a way as to vibrate.

11. An apparatus according to claim 10, in which said holder is driven in such a way as to vibrate along a vertically arranged path.

12. An apparatus according to claim 1, in which said extraction device includes at least one holder which is provided with air passages for effecting withdrawal of said components from said receiving means of said drums.

13. An apparatus according to claim 12, in which said air passages are directed at an angle to said longitudinal axes of said drums.

14. An apparatus according to claim 1, which includes a guide arrangement which is disposed in the region below said crossover mixing zone of said trajectories.

15. An apparatus according to claim 14, in which said guide arrangement is formed by two guide plates which converge in the direction of flight of said components, and define an outlet for the mixed components.

16. An apparatus according to claim 15, which includes a screen disposed in the region below said guide arrangement for receiving said components therefrom.

17. An apparatus according to claim 16, in which said screen is driven in such a way as to vibrate.

18. An apparatus according to claim 17, in which said screen is driven in such a way as to vibrate along a vertically arranged path.

19. An apparatus according to claim 17, in which said extraction device includes a holder which is driven in such a way as to vibrate along a vertically arranged path; and which includes a vibration drive for driving said holder and said screen in common.

* * * * *